April 21, 1959 S. E. TURSMAN 2,882,608
WHEEL ALIGNMENT EQUIPMENT
Filed April 7, 1955 3 Sheets-Sheet 2

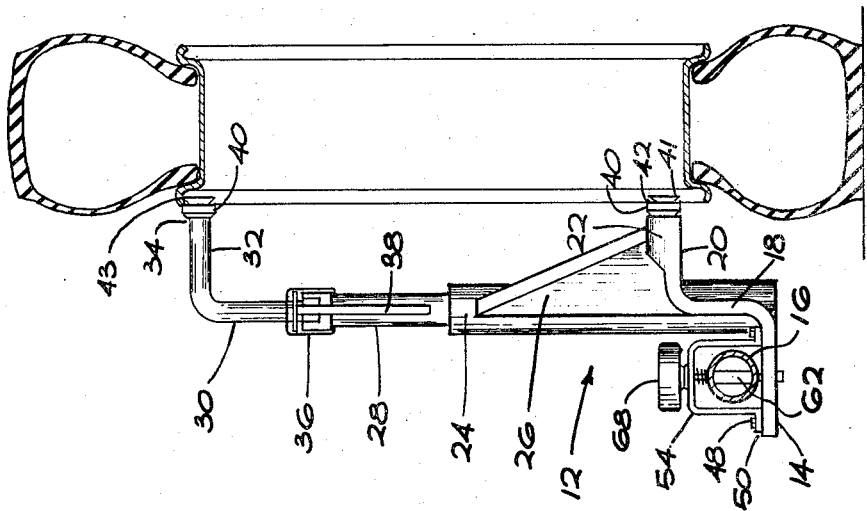
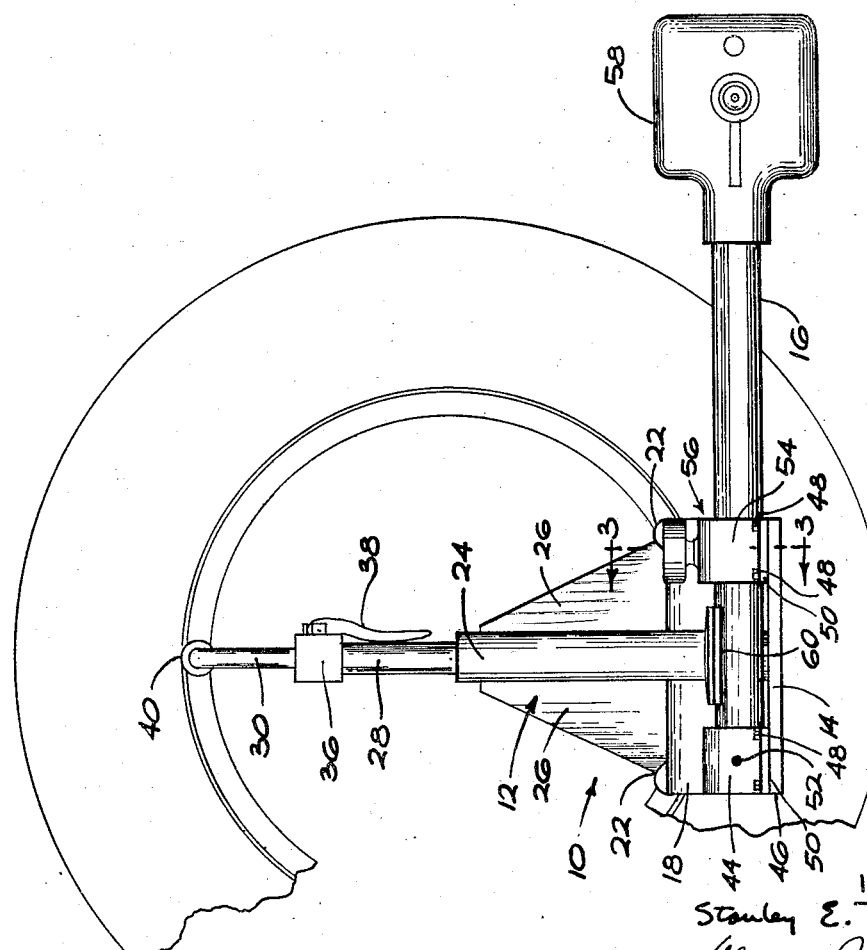

INVENTOR
Stanley E. Tursman
BY Darrene A. Horton
ATTY.

April 21, 1959 S. E. TURSMAN 2,882,608
WHEEL ALIGNMENT EQUIPMENT
Filed April 7, 1955 3 Sheets-Sheet 3
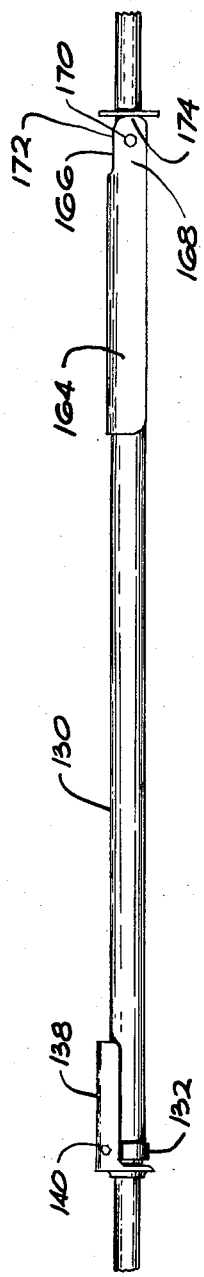
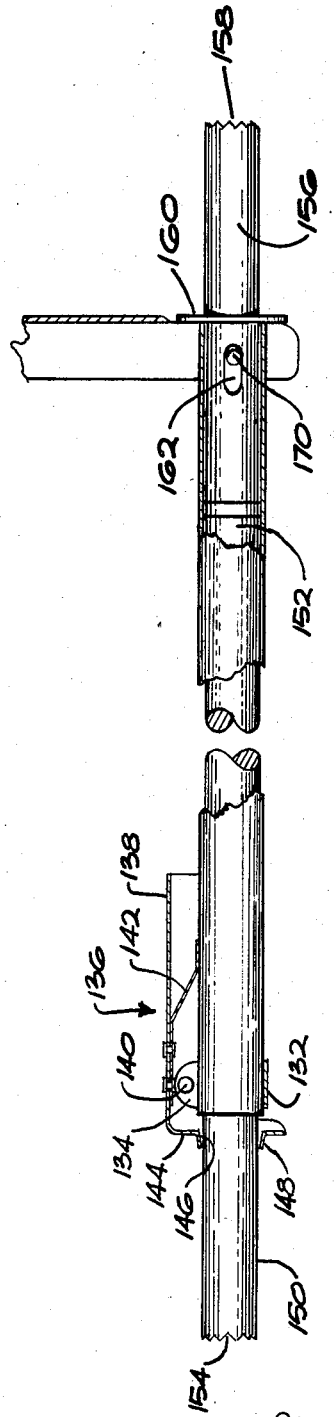
INVENTOR
Stanley E. Tursman
BY Warren A. Horton
ATTY.

United States Patent Office 2,882,608
Patented Apr. 21, 1959

2,882,608

WHEEL ALIGNMENT EQUIPMENT

Stanley E. Tursman, Hinsdale, Ill.

Application April 7, 1955, Serial No. 499,851

12 Claims. (Cl. 33—203.18)

This invention relates to improvement in wheel alignment equipment with which to measure and adjust the alignment of the front turning wheels of automotive vericles.

It is an object of this invention to provide wheel alignment equipment, with which measurements and adjustments may be made to correct "toe-in" and "toe-out" angles, and the caster and camber angles of automobile front wheels, which is greatly simplified over equipment previouly used for such purposes, and which may therefore be manufactured economically and at greatly reduced cost.

A further object of my invention is to provide wheel alignment equipment wherein the inter-dependent factors of toe-in and camber can be determined simultaneously and each adjusted while observing the effect of the adjustment of one on the other.

Another object of my invention is to provide equipment of the type described wherein a test of a vehicle's wheels may be made in much less time and much more simply than with equipment previously known.

Another object of my invention is to provide wheel alignment equipment wherein the calibration thereof requires only the simplest of procedures and when once calibrated remains accurate under normal conditions of use.

Still another object of my invention is to provide equipment wherein the measurement is made with reference to a theoretical or imaginary plane and which therefore avoids the necessity of having perfectly level, true or plumb reference surfaces and of having perfectly level and evenly worn and inflated tires on the vehicle.

A further object of my invention is to provide equipment wherein caster, camber and toe-in are all measured with the measuring device occupying a single position, thereby effecting a considerable saving in time and reducing greatly the possibility of error.

Other objects and advantages of my invention will be apparent from the following description and drawings, of which:

Fig. 1 is a side elevation of one of the units of my invention shown mounted on the right front wheel of a vehicle;

Fig. 2 is a front elevation of the device of Fig. 1 shown partially in section;

Fig. 7 is a plan view of the spreader adapted for use in conjunction with the alignment testing equipment;

Fig. 8 is an enlarged view of the left-hand end of Fig. 7 shown partially in section; and, Fig. 9 is an enlarged view of the right-hand end of Fig. 7 shown partially in section.

Figure 3:
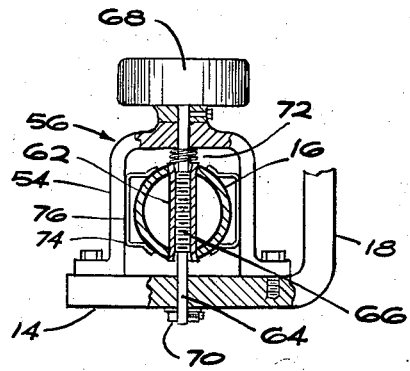
Fig. 3 is a section taken substantially along the line 3—3 of Fig. 1, looking in the direction of the arrows.
Figure 4:
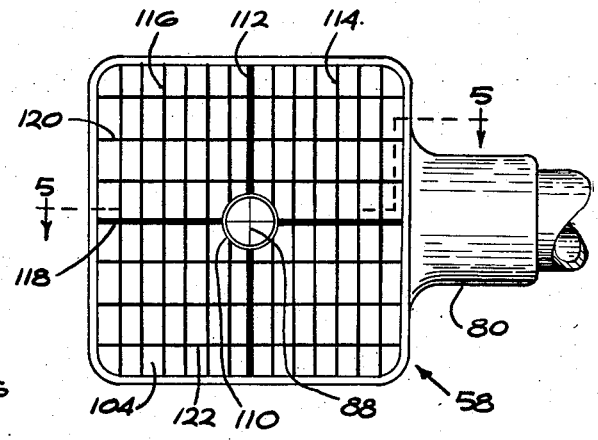
Fig. 4 is an elevation of the face of the head of the device illustrated in Fig. 1.
Figure 5:
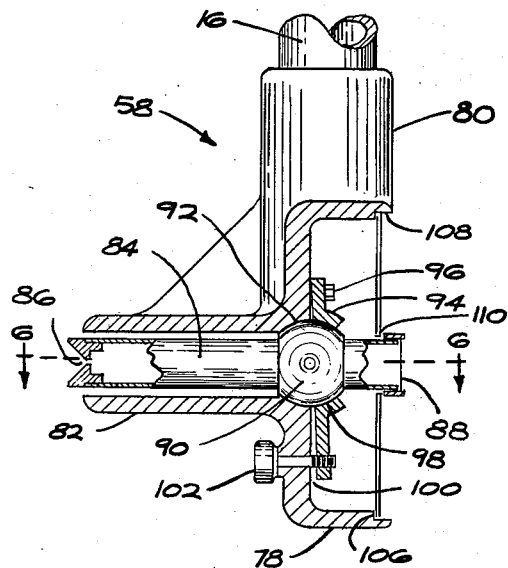
Fig. 5 is generally a section taken substantially along the line 5—5 of Fig. 4.
Figure 6:
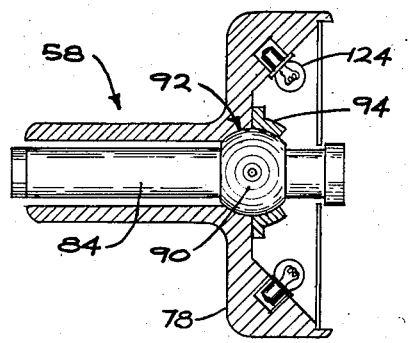
Fig. 6 is a section taken substantially along the line 6—6 of Fig. 5, looking in the direction of the arrows.

The apparatus of my invention comprises two units of identical construction, one, however, being the mirror image of the other. One of these units is illustrated in Fig. 1 as being attached to the right front wheel of an automobile. It will be understood that a mirror copy will be attached to the left front wheel of the automobile.

The unit 10 comprises first a cradle 12 which preferably is a one piece casting of light metal. The cradle may perhaps best be described as consisting of a continuous plate, curved to define first a floor piece 14 for a support arm 16 to be described hereafter. Inwardly of the floor 14, the plate extends vertically as at 18 in the same width, and then horizontally inward to provide a rim clamp support 20. A pair of inwardly facing bosses 22 are formed on the opposite lateral edges of theh support 20. A jack housing 24 extends upwardly from the inner edge of the floor 14 to be central in and axially aligned with the vertical portion 18. The jack housing 24 extends substantially above the clamp support 20, and a pair of gussets 26 extend between the jack housing 24 and the clamp support 20 to make the cradle rigid. It will be noted that the gussets 26 extend to the inner edge of the support 20 or, in other words, inwardly away from the jack housing 24 and not coplanar with each other so as to provide a maximum of rigidity.

The jack housing has an axial bore in the upper end thereof which contains a jack sleeve 28. A jack post 30 in turn is contained in the sleeve 28. The upper end of the post 30 is bent inwardly through a right angle to place the end 34 of the post in the same vertical plane as the inner ends of the bosses 22. Appropriate jacking mechanism 36, having an operating handle 38, is connected to the sleeve 28 and associated with the post 30 for forcibly elevating the post and locking the post in a fixed elevated position.

Both the end 34 of the horizontal portion 32 of the post 30 and the inner ends of the bosses 22 are bored to receive rim clamps 40. The rim clamps have sharp clamping edges 41 at their outer end and shoulder flanges 42 inwardly thereof limiting accurately the insertion of the edges into the wheel rim 43. The clamps have shanks (not illustrated) which fit within the bores of the bosses 22 and the post end 34.

The support arm 16 is secured to the base 14 by, first, a U-shaped bracket 44 adjacent the rearward edge 46 of the base 14. The bracket 44 is secured to the floor 14 by bolts 48 through flanges 50 on the lower edges of the bracket. The inner end of the arm 16 is contained in bracket 44 by a pivot pin 52 extending from side to side of the bracket and through appropriate holes in the end of the arm 16.

At the other end of the floor, a similar U-shaped bracket 54 is mounted in like fashion thereto. The bracket 54 is a component of the level adjustment indicated generally by 56 which is illustrated in detail in Fig. 3.

The support arm 16 is simply a tubular member fixed at one end in the bracket 44 as described before, extending through the bracket 54 and having a head 58 on the other end thereof. The arm has a spirit level 60 secured to the top thereof between brackets 44 and 54. Within bracket 54, the support arm 16 has a vertical bore therethrough in which is pressed an internally threaded sleeve 62. A shaft 64 extends vertically through opposite bores in the floor 14 and the upper part of the bracket 54. The shaft 64 has a central threaded portion 66 which engages the threaded sleeve 62. The shaft is confined at its upper end by a knob 68 bearing against the upper side of the bracket 54. The lower end of the shaft carries a lock nut 70 under the floor 14. A coiled compression spring 72 surrounds shaft 64 between the arm 16 and the upper part of the bracket 54 to urge the arm 16, the shaft 64, and the knob 68 downwardly.

The arm 16 may have U-shaped wings 74 secured to the sides thereof within the bracket 54 which provide accurate vertical surfaces 76 slidably engaging the internal vertical sides of the bracket 54 so as to maintain the axial orientation of the arm 16.

The target or sight housing is likewise preferably a light metal casting and consists generally of a rectangular dish-shaped body 78 having a tubular boss 80 extending outwardly from one edge thereof and a tubular sight tube housing 82 extending centrally from the bottom thereof. The housing 58 is fixedly secured to the end of the arm 16 by welding or riveting the boss 80 to the end of the arm. The head should be immovable with respect to the arm.

A sight tube 84, contained within the sight tube sleeve 82, has a pin hole aperture 86 at one end and cross hairs 88 at the other end. The sight tube 84 fits loosely within the sleeve 82 for purposes of adjustment.

An externally spherical sleeve 90 to constitute a ball is mounted on the sight tube 84. The end of the sleeve 82 adjacent the bottom of the member 78 is concavely beveled as at 92 to define a part of a socket joint. A plate-like pivot retainer 94 is secured in the bottom of member 78 by bolt 96 and has a through aperture therein surrounded also by a concave bevel 98 to define the remaining part of the socket in which the ball 90 may rotate. The socket defined by the bevel 98 may be slightly smaller than the ball 90 so that the retainer 94 cannot lie flat against the bottom of the member 78, as at 100. On the opposite side of the retainer 94 from the bolt 96 is a threaded hole, and an adjusting screw 102 extends through the bottom of the member 78 and has a threaded end engaging the threaded hole in the retainer 94. Tightening the screw 102 will have the effect of bringing the retainer closer to the bottom of the member 78 and pinching the ball 90 to fix the sight tube in a predetermined position.

The face of the member 78 has a translucent target 104 thereon retained against a shoulder 106 by a lip 108. The target has a hole 110 in the center thereof through which the cross hair end of the sight tube 84 extends. The hole should be larger than the end of the sight tube in order to permit a range of adjustment of the sight tube.

The face of the target has visible calibrated lines thereon. The vertical line 112 in the center of the target represents zero toe, and the lighter vertical lines to the right 114 represent toe-in. The vertical lines to the left 116 represent toe-out. The heavy central horizontal line 118 represents zero camber. The lighter horizontal lines above 120 represent positive camber, and the lighter horizontal lines 122 below represent negative camber. An appropriate calibration for the toe or vertical lines would be each line representing 1/16 of an inch of wheel toe. The horizontal camber lines might represent one-half a degree of camber. A pair of lights 124 may be contained within the member 78 behind the target 104 and adapted for connection to the electric system of the vehicle being tested to illuminate the target in well-known fashion.

My device is also suitable for measuring the caster angle. The means which I employ, however, for this measurement are entirely conventional and therefore the parts associated with this measurement have not been shown. To make this measurement, a vertical pointer would be attached to the floor 14 to extend nearly to the ground and a protractor would be provided to rest on the ground under the pointer so that the pointer indicates degrees of turn of the wheels. The spirit level 60, for purposes of camber and toe-in measurement, need indicate only a leveling of the support arm 16. For the caster measurement, however, the spirit level should have additional markings thereon to indicate degrees of tilt.

My device is calibrated by providing two parallel and vertical surfaces to which the two components of my invention are secured. A circular hole similar to an automobile wheel rim may be provided in the surfaces to permit the mounting of the units to the surfaces by means of the rim clamps 40. In such a hole, the lower two rim clamps would be inserted to rest on the bottom part thereof with the shoulder flanges 42 against the surface and the post 30 then jacked up to bring the upper rim clamp into engagement with the top of the hole, the shoulder flange thereof being also against the surface. The cradle thus is oriented to be exactly vertical. The cradle is attached to the surface so that the arm 16 is approximately horizontal. The knob 68 is then rotated to swing the arm 16 up or down about the point of pivotal attachment 52 until the spirit level shows the arm to be exactly horizontal.

The two units being so mounted and adjusted with the heads 58 facing each other, the adjusting screw 102 of one of the heads is then loosened to permit the sight tube 84 to be moved. The operator then sights through the sight tube to bring the cross hairs to bear exactly on the lines of zero toe and zero camber 112 and 118 of the opposite target and the adjusting screw 102 is then tightened. The same procedure is then followed to adjust the sighting tube of the opposite head, reading back on the target of the first described head.

It will be appreciated that the spirit level is factory calibrated, that the wings 74 are factory formed accurately to avoid any rotary looseness of the arm 16 and that the heads 58 are attached to the arm 16 rigidly so as to be exactly parallel to the vertical surfaces of the wings 74 and the plane defined by the three rim clamps 40.

In use, the two units of my device are secured to the front wheels of the vehicle with the heads facing each other. The lower rim clamps are set into the rim so that the shoulder flanges 42 abut against the edge of the rim and the post 30 jacked up to secure the cradle firmly to the wheel. Again, the installation is made so that the arm 16 is horizontal to the eye. Thereafter the level adjustment is operated to make the arm 16 exactly horizontal as read on the spirit level 60 with the vertical wheels in the straight ahead position.

To determine the caster angle, the wheels are then turned through a measured degree as read by the pointer against the protractor and the calibration of the spirit level is such that it may read directly in degrees of caster. As was pointed out before, this technique for measuring caster is well-known in the art and has therefore not been illustrated.

To measure camber, the wheels being in the straight ahead position, the camber angle for the left front wheel is read directly by sighting through the eyepiece on the left front side and reading the alignment of the horizontal cross hair on the target attached to the right front wheel. By virtue of the target calibrations, the reading obtained is the actual camber for the left front wheel. The camber of the right front wheel is similarly determined.

The adjustment of wheel toe is often accomplished by positioning one of the front wheels of the vehicle in a straight ahead or zero toe position and making all of the adjustment in the other wheel. As the vehicle is operated, the toe-in so obtained will of course be divided equally between the wheels. Accordingly, a procedure which may be followed for adjusting toe is, the two units being placed and adjusted as for the camber determination, to bring the left front wheel to the zero toe position accurately by sighting through the left sight tube and turning the wheels until the vertical cross hair aligns with the zero toe line 112 on the right target 104. Thereafter by sighting through the right sight tube on the left target, the degree of toe may be instantly read.

It will be appreciated from the foregoing description that my invention provides for a quicker and highly accurate determination of the camber, caster and toe of a pair of vehicle wheels. The two devices which constitute my equipment may be easily applied to the front wheels. A simple leveling adjustment is provided to bring my measuring apparatus to its zero position and that thereafter nothing further is required than movement of the wheels of the vehicle and a simple reading of the instruments for all three measurements. It will be appreciated further that my device is exceedingly simple structurally and the elements thereof are bilaterally symmetrical so that for all practical purposes the same parts may be used to form both the left-hand and right-hand units. It will also be seen that my device is easily calibrated and the calibration equipment is inexpensively provided.

It will also be appreciated that my device is capable of modification so that camber and toe can be measured simultaneously with the arms 16 in the vertical position. To do this, the mounting of the cradle 12 is turned through roughly ninety degrees on the associated vehicle wheel and the spirit level of course must be repositioned to be centered when the arms lies in a vertical plane parallel to a plane constructed transversely of the vehicle through, for instance, the centers of the measured wheels. Camber would then be shown by an upward divergence or convergence of the arms which would cause the sight tube to sight on the opposite target above or below the horizontal line of zero camber to indicate positive or negative camber respectively. Likewise, wheel toe would be indicated by a sight tube alignment on the opposite target to the rear or front of the vertical line of zero toe to indicate respectively toe-in or toe-out. It will, furthermore, be evident that a spirit level, however positioned to be brought to horizontality, can be employed in the measurement of caster. I have concluded, however, that the illustrated embodiment of my invention employing the horizontal arm 16 is a simpler structure and that form has therefore been illustrated.

In the measuring of toe-in, it frequently occurs that wear has taken place since the time the vehicle left the factory. Although the wear in each joint may be slight, there are so many joints which control the toe-in between the two front wheels that the cumulative effect of the wear results in considerable play in the wheels. In the measurement and adjustment of toe-in, therefore, it is desirable that some fixed reference position be used, on which the necessary measurements are made and to which the necessary adjustments are performed. Generally, it is preferred that the end point of the play in the direction of least toe-in constitute that reference position.

To place the wheels in this reference position, I provide a spreader bar which is illustrated in Figs. 7 through 9. The spreader bar comprises a long sleeve 130 having a collar 132 thereabout at one end which provides a pair of ears 134. The ears furnish a point of attachment for a friction grip indicated generally by 136. The friction grip consists of a curved handle 138 partially overlying the end of the sleeve 130. A bolt 140 passes through the handle and the ears to secure the handle to the sleeve 130. A spring 142 is riveted at one end to the handle and bears against the sleeve at its other end underneath the handle to bias the handle arcuately away from the sleeve 130. The grip 136 extends beyond the end of the sleeve 130 and makes a right angle bend to constitute a ring clamp 144, to overlie the end of the sleeve. The ring clamp has a central hole 146 therein about equal to the inside diameter of the sleeve 130. The edges of the clamp ring hole taper convergingly outwardly as at 148.

A spacer tube 150 extends through the ring clamp 144 and the inner end 152 thereof is telescopically contained within the sleeve 130. The outer end 154 of the tube may be knurled or corrugated.

A shorter, extension tube 156 is contained in the other end of the sleeve 130 and projects therefrom. The free end 158 thereof is likewise knurled or corrugated. The tube 156 has an annular collar 160 secured thereto at about the mid-point thereof. Inwardly of the collar 160, the tube is longitudinally slotted as at 162. A clamp 164 formed of generally U-shaped stock proportioned to overlie the sleeve 130 has the web thereof removed at one end 166 to define a pair of ears 168 on either side of the sleeve 130. A rivet 170 or equivalent fastening means extends between the ears and through appropriate holes in the sleeve 130 and the slot 162 in tube 156. The tube 156 is therefore permitted limited movement to approximately the length of the slot 162. The distance from the rivet 170 to the top 172 of the ears is substantially less than the distance from the rivet to the end 174 of the ears.

In use, the spreader bar is held between the front wheels of the vehicle to be checked, and the spacer tube 150 is manually extended to bring the ends 154 and 158 in contact with the tires on the wheels at the front of the wheels. The ring clamp is urged out of line with the center of the sleeve 130 by the spring 142. The outward taper 148 of the opening 146 permits a very easy manual extension of the tube 150 but the sharp edge of the taper urged into the tube 150 locks it tightly against contraction.

In the meantime, the clamp handle 164 has been raised to stand at right angles to the sleeve 130, thereby permitting the tube 156 to retract to its maximum extent within the sleeve 130, or in other words, as illustrated in Fig. 9. The handle 164 is then moved to its clamping position wherein it overlies the sleeve 130 as illustrated in Fig. 7. The ears 168 thus engage the collar 160 and move the tube 156 outwardly to apply substantial "spreading" pressure against the front portions of the wheels. Thereafter the determination of toe will be made as described above.

It will be appreciated that the spreader bar does not interfere in any way with the manipulation of the sighting equipment described before. After the determination has been made, the spreader bar is released from the wheels by moving the clamp handle 164 to its position perpendicular to the sleeve 130 and the handle 138 of the ring grip 136 is depressed to place the hole 146 in alignment with the interior bore of the sleeve 130, thereby permitting a ready retraction of the tube 150.

It will be appreciated that I have illustrated and described but a single embodiment of my invention. Certain alternatives have been described above and others will be evident to those skilled in the art. I prefer, therefore, that my invention be regarded as being limited only as set forth in the following claims.

I claim:

1. Wheel alignment equipment for measuring the camber and toe of a pair of vehicle wheels comprising, for each of said wheels a cradle adapted to be secured to said wheels to occupy a predetermined plane with respect to the plane of said wheels, an arm pivotally connected to said cradle for movement in a plane parallel approximately to the plane of said wheel to extend away from said cradle in said parallel plane beyond the body of said vehicle, means on said cradle for adjusting said arm to an exact predetermined line in said parallel plane, a target having calibrations thereon at right angles to each other fixed to the other end of said arm to be parallel to the plane of said wheel and facing another similar target associated with the other wheel and a sighting device including crosshairs mounted centrally in said target for viewing said opposite target, said calibrations and said crosshairs being vertical and horizontal when said arm is oriented on said predetermined line.

2. The combination as set forth in claim 1 wherein said predetermined line is exactly horizontal.

3. The combination as set forth in claim 1 wherein said predetermined line is in a vertical plane parallel to the vertical plane extending transversely of the vehicle through the centers of the measured wheels.

4. The combination as set forth in claim 1 wherein said arm includes a spirit level to determine the adjustment thereof to said horizontal position.

5. The combination as set forth in claim 1 wherein said cradle includes two spaced stationary rim clamps having sharp edges to engage the interior of the rim of said wheel and shoulders backward from said edges to limit the insertion of said edges into said rim, a movable member, and a third rim clamp having a like edge and shoulder connected to said movable member to engage said rim at a point opposite said stationary rim clamps.

6. The combination as set forth in claim 1 wherein said sighting device is adjustable in said target mounting to be calibrated to read on the center of the opposite target when said cradles are secured to parallel vertical calibrating surfaces.

7. The combination as set forth in claim 1 including additionally members secured to said arm providing surfaces spaced from said point of pivotal connection oriented in the plane of movement of said arm with respect to said pivotal connection and members on said cradle providing surfaces parallel to and closely engaging said surfaces on said arm to prevent axial rotation of said arm.

8. The combination as set forth in claim 1 including additionally means for spreading said wheels forwardly of the axes thereof to take up looseness in the mounting linkage of said wheels preliminary to measuring the camber and toe thereof.

9. Wheel alignment equipment for measuring the camber and toe of a pair of vehicle wheels comprising a unit for each of said wheels, each unit having a target with calibration scales thereon at right angles to each other, a sighting device including a line-of-sight indicator for sighting on the opposite target, securing means for attaching said unit to the wheel in a predetermined plane relative to the plane of said wheel, an arm supporting said target and sighting device from said securing means at a distance therefrom to permit the cross viewing of said targets through said sighting devices beyond the vehicle, said arm being adjustable on said securing means to a predetermined line relative to the plane of said wheel, said target and said sighting device being fixed to said arm, and means to prevent axial rotation of said arm.

10. Wheel alignment equipment for measuring the camber and toe of a pair of vehicle wheels comprising a unit for each of said wheels, each unit having a target with horizontal and vertical calibration scales thereon, a sighting device including a line-of-sight indicator centrally mounted in said target for sighting on the opposite target, means for attaching said unit to the wheel in a predetermined plane relative to the plane of said wheel, an arm mounted on said attaching means supporing said target and sighting device at a distance therefrom to permit the cross viewing of said targets through said sighting devices beyond the vehicle, said arm being adjustable on said attaching means to a predetermined line relative to the plane of said wheel, said target and sighting device being fixed to said arm to face the other target and sighting device squarely when said wheels are parallel to each other to give readings of zero toe and camber, and means to prevent the axial rotation of said arm.

11. Wheel alignment equipment for measuring the camber and toe of a pair of front vehicle wheels comprising a unit for each of said wheels, each unit having a target, the face of said target having calibration lines at right angles to each other, a sighting device for sighting on the opposite target, said sighting device having cross hairs therein, securing means for attaching said unit to the wheel in a predetermined plane relative to the plane of said wheel, an arm supporting said target and sighting device from said securing means beyond the front of the vehicle, said arm being adjustable on said securing means to an exactly horizontal position, said target and said sighting device being fixed to said arm to face the target mounted on the other of said wheels squarely when said wheels are parallel, and means to prevent axial rotation of said arm.

12. Wheel alignment equipment for measuring the camber and toe of a pair of front automobile wheels comprising a unit for each of said wheels, each unit having a target, the face of said target having calibration lines at right angles to each other, a sighting device for sighting on the opposite target, said sighting device having cross hairs therein, securing means for attaching said unit to the wheel in a predetermined plane relative to the plane of said wheel, an arm supporting said target and sighting device from said securing means to project above the hood of said vehicle to permit the cross viewing of said targets through said sighting devices, said arm being adjustable on said securing means to a vertical plane transversely of the automobile, said target and said sighting device being fixed to said arm to face the target mounted on the other of said wheels, and means to prevent axial rotation of said arm.

References Cited in the file of this patent

UNITED STATES PATENTS

| 2,337,502 | Scott et al. | Dec. 21, 1943 |
| 2,475,502 | Holmes | July 5, 1949 |
| 2,624,123 | Wilkerson | Jan. 6, 1953 |
| 2,689,403 | Wilkerson | Sept. 21, 1954 |
| 2,755,554 | MacMilan | July 24, 1956 |
| 2,777,211 | Martin | Jan. 15, 1957 |

FOREIGN PATENTS

| 535,330 | Great Britain | Apr. 7, 1941 |
| 998,680 | France | Sept. 21, 1951 |